United States Patent [19]
Ford et al.

[11] Patent Number: 5,494,506
[45] Date of Patent: Feb. 27, 1996

[54] GAS FILTERING DEVICE FOR AIR BAG GAS GENERATOR

[75] Inventors: Brian M. Ford, Grayslake, Ill.; John J. Wetula, Richmond Heights, Ohio

[73] Assignee: UCAR Carbon Technology Corporation, Danbury, Conn.

[21] Appl. No.: 373,593

[22] Filed: Jan. 17, 1995

[51] Int. Cl.⁶ .......................... B01D 39/00; B01D 46/00
[52] U.S. Cl. .................. 55/502; 55/385.3; 55/510; 55/527
[58] Field of Search .................. 55/385.3, 502, 55/507, 509, 510, 522, 523, 525–528; 280/728 R

[56] References Cited

U.S. PATENT DOCUMENTS

| | | | |
|---|---|---|---|
| 2,114,341 | 4/1938 | Farmer | 55/502 |
| 2,132,940 | 10/1938 | Farmer | 55/502 |
| 2,252,724 | 8/1941 | Myers | 55/502 |
| 2,682,315 | 6/1954 | Evans | 55/502 X |
| 3,404,061 | 10/1968 | Shane et al. | 161/125 |
| 4,322,385 | 3/1982 | Goetz | 55/526 X |
| 4,865,635 | 9/1989 | Cuevas | 55/523 X |
| 4,895,713 | 1/1990 | Greinke et al. | 423/448 |
| 5,064,459 | 11/1991 | Unterforsthuber et al. | 55/526 X |
| 5,176,863 | 1/1993 | Howard | 264/113 |
| 5,204,068 | 4/1993 | O'Loughlin et al. | 55/525 X |
| 5,215,724 | 6/1993 | Haerle | 55/525 X |
| 5,308,370 | 5/1994 | Kraft | 55/487 |
| 5,318,323 | 6/1994 | Pietz | 280/736 |
| 5,324,075 | 6/1994 | Sampson | 280/736 |
| 5,335,940 | 8/1994 | Cuevas | 280/737 |
| 5,346,248 | 9/1994 | Rhein | 280/728 |

FOREIGN PATENT DOCUMENTS

| | | | |
|---|---|---|---|
| 5-200216 | 8/1993 | Japan | 55/502 |
| 1433232 | 4/1976 | United Kingdom | 55/509 |

*Primary Examiner*—Robert Spitzer
*Attorney, Agent, or Firm*—F. J. McCarthy

[57] ABSTRACT

A gasket arrangement is provided for a filter in a pyrotechnic gas generator which includes a compressed sheet formed of a combination of intercalated graphite particles and exfoliated flexible graphite particles.

2 Claims, 3 Drawing Sheets

GAS FILTERING DEVICE FOR AIR BAG GAS GENERATOR

FIELD OF THE INVENTION

The present invention relates to a device for removing particulate matter from a very high temperature and very high velocity gas stream created by the ignition of an air bag gas generant such as alkali metal azides.

BACKGROUND OF THE INVENTION

Automobile air bag restraint systems commonly use pyrotechnic gas generants such as alkali metal azides to rapidly generate the relatively large amount of gas required almost instantaneously to inflate the air bag. The alkali metal azide generant is caused to ignite and burn, at temperatures of 2000° F. and higher, to provide a high velocity gas stream. The combustion of the generant results in the formation of a relatively large amount of particles, some of which is hazardous and hence needs to be filtered from the gas stream before its entry into the air bag. Presently used filtering media involve the use of metal fibers and ceramics which can withstand the high temperature environment. Also, the very high temperature and caustic environment resulting from the use of alkali metal azide generants limits the effectiveness of common gasket materials and hence the effectiveness of the filter system.

SUMMARY OF THE INVENTION

A filtering device is provided for removing particulate matter from an exhaust stream of a pyrotechnic gas generator which comprises a composite sheet of compressed particles of intercalated graphite and exfoliated flexible graphite in a gasket relationship on the end surfaces of a filtering mass so that the sheet bears against metal surfaces in the gas generator and the end surfaces of the filter. Upon being exposed to the high temperatures of the gases resulting from the ignited metal alkali azide generant, the sheet expands rapidly due to exfoliation of the intercalated particles in the sheet and the thermal conductivity decreases with the result that the gasket seal is enhanced. The sheet material, which is described in U.S. Pat. No. 5,176,863, and proposed for use as a fire proof floor or wall covering, is self-cooling and will not ignite under the conditions to which it is exposed in the gas generator.

DETAILED DESCRIPTION OF THE INVENTION

Figure 1:
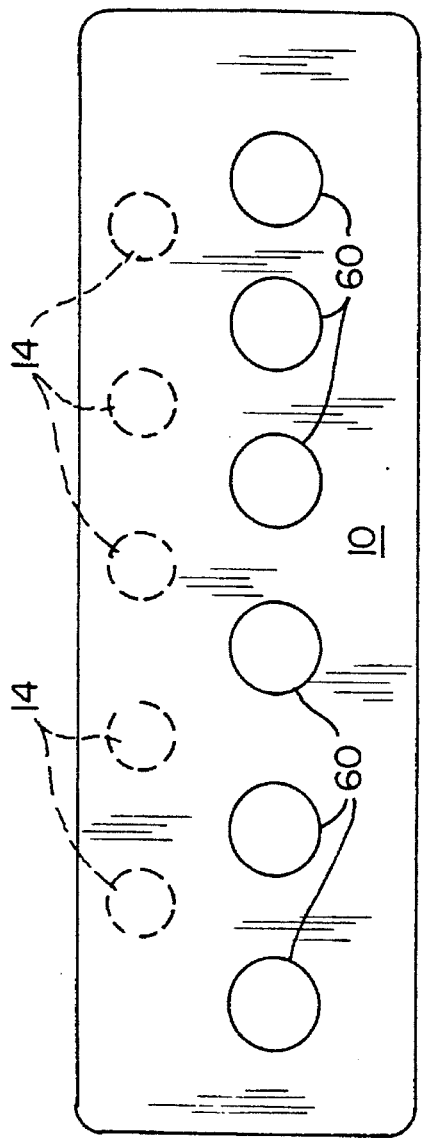
FIGS. 1, 1(A) show a prior art pyrotechnic gas generator with a conventional filter for removing particles from the exhaust gas stream of the generator.
Figure 1A:
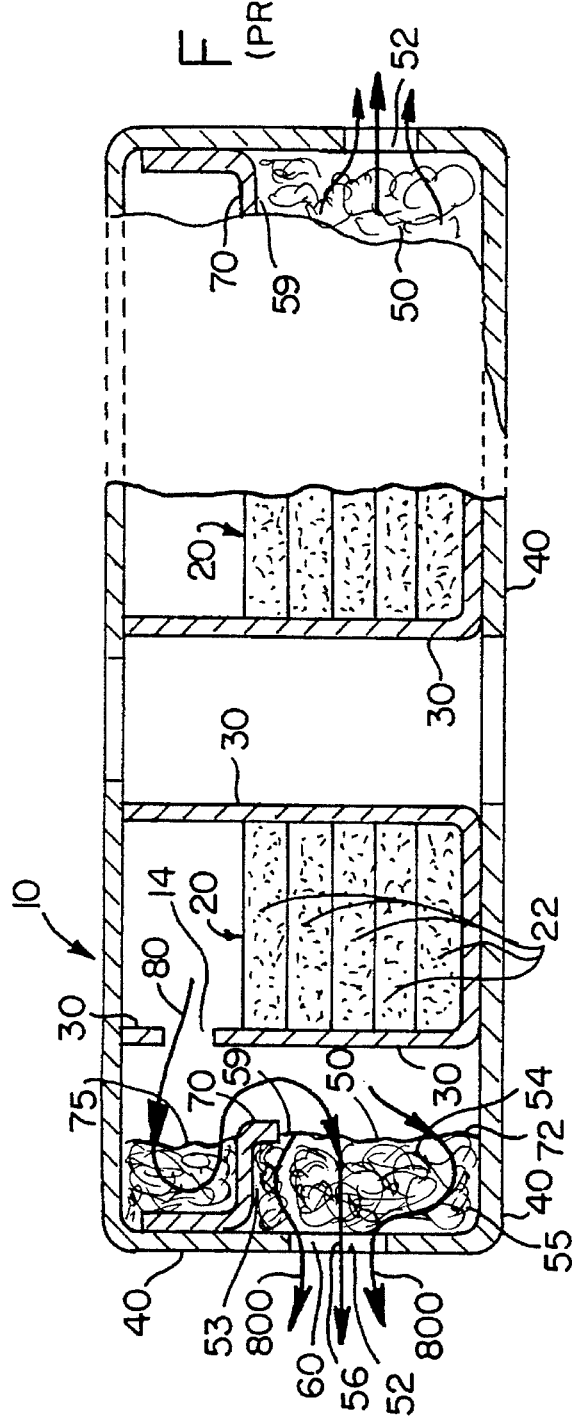
Figure 4:
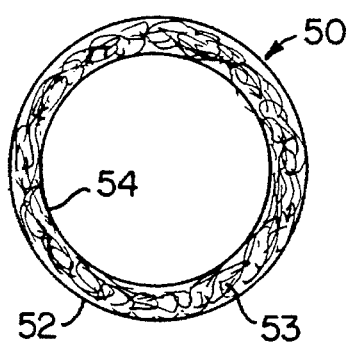
FIGS. 4, 4(A) show the prior art filter body included in the device of FIGS. 1, 1(A), 2 and 3.
Figure 4A:
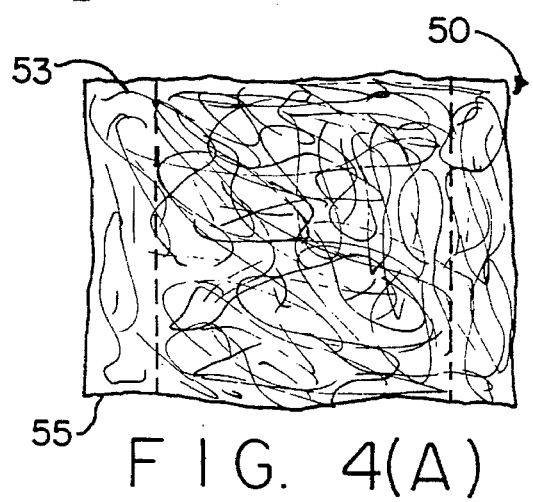

With reference to FIGS. 1, 1(A) a conventional, prior art gas generator is shown at 10 and includes metal alkali azide gas generant 20, in the form of annular disks 22, which are stacked in annular vessel 30 which is secured, e.g. by welding, to the metal housing 40, of gas generator 10. An annularly shaped filtering body 50, made from a mat of metal fibers, or from a composite of wire mesh and ceramic fiber mat is positioned in the gas generator 10 with one of its sides 52 adjacent gas exit ports 60, and its opposite side 54 transverse to the direction 56 of the exhaust gas stream resulting from the ignition of alkali metal azide 20 as hereinafter described. The upper surface 53 and lower surface 55 of filtering body 50, shown more clearly in FIGS. 4 and 4(A), respectively bear against the inner surface 59 of circumferential metal deflector element 70 and the bottom interior surface 72 of metal housing 40. With the ignition of alkali metal azide gas generant 20, e.g. by means of a conventional electrode (not shown) a very high temperature exhaust gas stream, indicated at 80, passes, by way of circumferential apertures 14 in vessel 30, initially through a secondary annular filter body 75, similar in shape to filtering body 50. Some particles in gas stream 80 are trapped in filter body 75 and the direction of gas stream 80 is reversed by circumferential metal deflector element 70, and reversed again by the side wall of annular vessel 30 so that the direction of gas stream 80, as indicated at 56, is transverse to the side 54 of filter body 50 for entrapment of particles in gas stream 80. In the absence of a satisfactory gasket at the upper and lower surfaces 53, 55 of filter body 50, a portion of gas stream 80, indicated at 800, will by-pass filter body 50 by channeling around its upper and lower surfaces 53, 55 as illustrated in FIG. 1.

Figure 2:
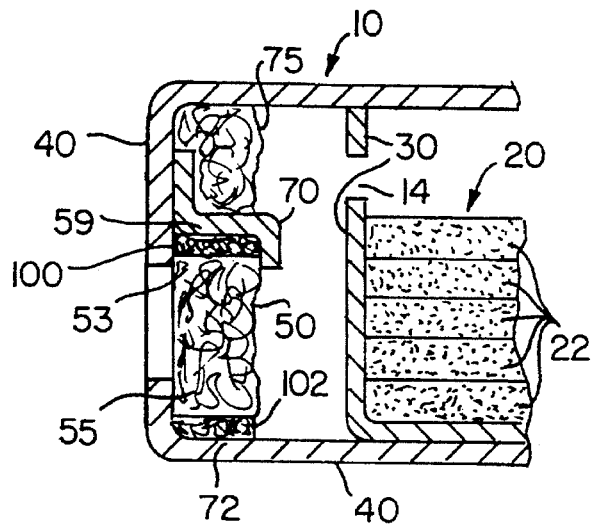
FIGS. 2 and 3 show the device of FIG. 1 having a gasket arrangement in accordance with the present invention.
Figure 3:
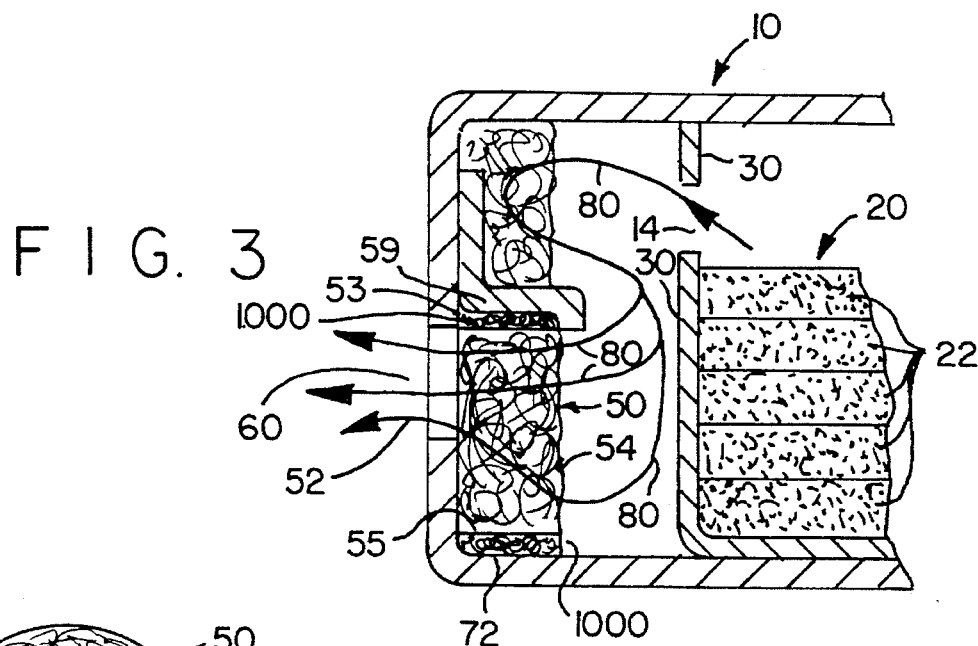

In the practice of the present invention, a compressed sheet of combined exfoliated flexible graphite particles and unexfoliated, intercalated graphite particles is provided in a gasket shape in a contacting gasket relationship at the upper and lower surfaces 53, 55 of filter body 50 as shown at 100, 102 in FIG. 2. This gasket material is the same material as that described for use as a fire proof floor or wall covering in U.S. Pat. No. 5,176,863. When used as a gasket in accordance with the present invention, as indicated at 100, 102 in FIG. 2, the gasket will expand as illustrated at 1000 in FIG. 3, upon contact with high temperature exhaust gas 80, and provide a gas tight, fire proof seal at the upper and lower surfaces 53, 55 of filter body 50 and all of the exhaust gas is caused to pass through filter body 50. Gasket expansion compensates for the thermal expansion of the metal housing 10, creating a gas tight seal. In the sectional view, FIG. 5(A), of a preferred embodiment shown in the top plan view of FIG. 5, the annular gasket 100 (102) comprises a compressed inner sheet of unexfoliated intercalated graphite 115 positioned intermediate overlaying outer sheets 117, 119 which are formed of compressed, exfoliated flexible graphite.

As described in U.S. Pat. No. 5,176,863, the disclosure of which is incorporated herein by reference, graphite is a crystalline form of carbon comprising atoms bonded in flat layered planes with weaker bonds between the planes. By treating particles of graphite, such as natural graphite flake, with an intercalant of, e.g., a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimensions as much as 80 or more times its original volume in an accordion-like fashion in the c-direction, i.e. in the direction perpendicular to the crystalline planes of the graphite. The exfoliated graphite particles are vermiform in appearance, and are therefore commonly referred to as worms. The worms may be compressed together into flexible sheets which, unlike the original graphite flakes, can be formed and cut into various shapes.

A common method for manufacturing graphite foil from flexible graphite is described by Shane et al, in U.S. Pat. No. 3,404,061 the disclosure of which is also incorporated herein by reference. In the typical practice of the Shane et al method, natural graphite flakes are intercalated by dispersing the flakes in a solution containing an oxidizing agent of e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoracetic acid, and a strong oxidizing agent soluble in the organic acid.

A preferred intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated excess solution is drained from the flakes. The quantity of intercalation solution retained on the flakes after draining is typically greater than 100 parts of solution by weight per 100 parts by weight of graphite flakes (pph) and more typically about 100 to 150 pph. After washing with water, the intercalated graphite flakes are dried and then exfoliated into flexible graphite by exposing them to a flame for only a few seconds at temperature greater than 700° C., more typically 1000° C. or higher.

The quantity of the intercalation solution may be limited to between 10 to 50 parts of solution per hundred parts of graphite by weight (pph) which permits the washing step to be eliminated as taught and described in U.S. Pat. No. 4,895,713 the disclosure of which is also herein incorporated by reference. The exfoliated graphite particles or worms are then compressed and rolled into a densely compressed flexible graphite foil sheet of desired density and thickness. Suitable exfoliation methods and methods or compressing the exfoliated graphite particles into thin foils are disclosed in the aforementioned U.S. Pat. No. 3,404,061 to Shane et al. It is conventional to roll and compress the exfoliated worms in stages with the product of the first or early stages of compression referred to in the art as "flexible mat". The flexible mat is then further compressed into a standard density sheet or foil of preselected thickness. A flexible graphite mat may be compressed into a thin sheet or foil of between 2–70 mils in thickness with a density approaching theoretical density, although a density of about 70 lbs./ft.$^3$ is acceptable for most applications.

Flexible graphite is known to be a relatively good thermal barrier with a thermal conductivity along its surface which is approximately twenty (20) or more times greater than through its thickness. It is known that a composite of mixed particles of exfoliated graphite with unfoliated particles of intercalated graphite flake possesses substantial fire retardant properties. This results from a further decrease in thermal conductivity through the thickness of the composite when exposed to high temperature such as in the presence of a fire. This decrease in thermal conductivity through the thickness of the composite is attributable to its expansion at high temperature. An expansion in thickness of twenty (20) times the unexpanded thickness has been realized from a composite containing about 30 weight percent of unexfoliated particles of intercalated graphite. The strength of the mixed composite decreases with increasing amounts of unexfoliated particles of intercalated graphite flake. A two layer composite of mixed particles may be formed by laying down a first bed of exfoliated particles of flexible graphite, or worms, and superimposing a second bed of unexfoliated particles of intercalated graphite in a desired proportion of e.g. 60 g of exfoliated particles to 40 g of intercalated graphite. The percentage of unexfoliated particles of intercalated graphite may range from between 10–60% by weight with 30–50% being preferred and about 40% anticipated as being the optimum.

The beds of graphite particles are rolled into a flexible mat and compressed into a thin two layer sheet. The rolling and calendaring operations cause the particles in each bed to intermix at the interface and to form a bonded interface. This, as understood by those skilled in the art, is very significant since it is very difficult to bond graphite once compressed into a foil. A three layer composite, such as shown at 100 in FIG. 5(A), may be formed by depositing a first layer 115 of e.g. 20 g of unexfoliated graphite, a second layer 117 of e.g. 20 g of exfoliated worms and a third layer 119 of e.g. 20 g of exfoliated worms in a symmetrical arrangement. In a three or more layer arrangement the total percentage of unexfoliated particles in the composite should still lie within the desired range of 10–60%.

Figure 5A:
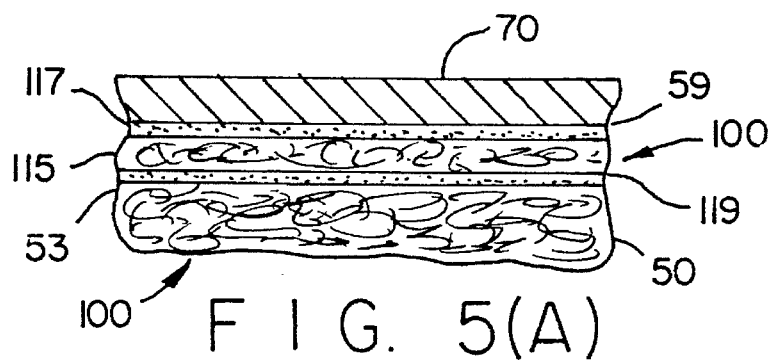
FIGS. 5, 5(A), 5(B) show a particular embodiment of a gasket in accordance with the present invention.
Figure 5:
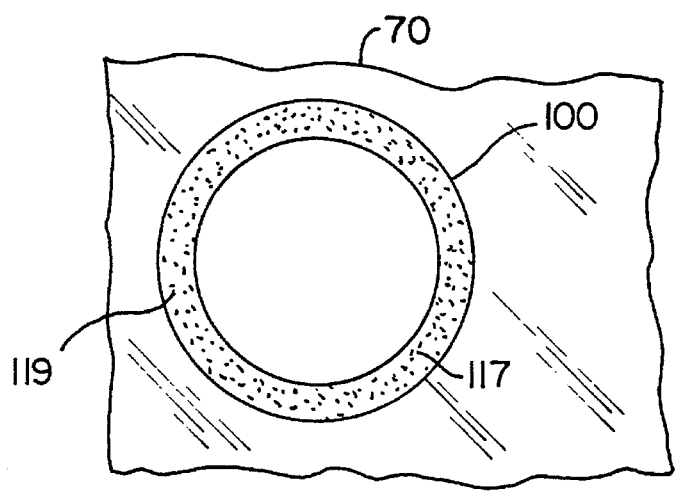
Figure 5B:
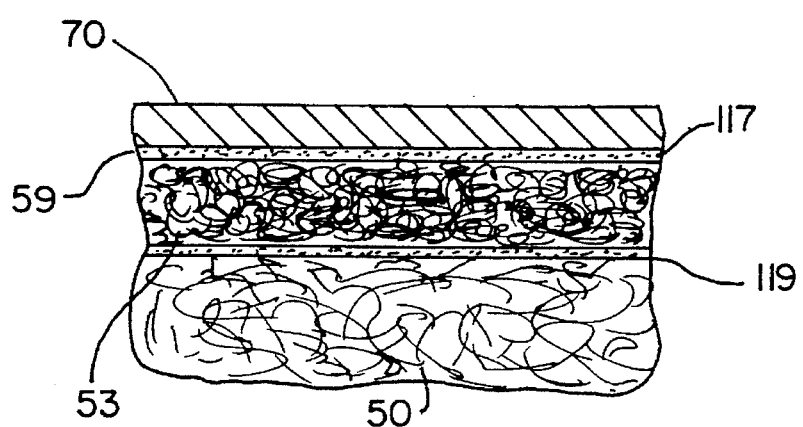

The fire retardant gasket, 100, as shown in FIG. 5(A) results from the composite of two or more graphite layers by compressing the composite into a sheet of desired thickness and cutting the sheet to a desired gasket configuration. When exposed to fire the thickness of the sheet expands due to the expansion of layer 115 of unexfoliated, intercalated graphite, forming a highly porous body with a substantial number of air pockets which reduces the thermal conductivity through its thickness. The graphite composite gasket is difficult to ignite because of its the high ignition temperature and as such is self-cooling and the expansion of the graphite composite gasket provides a tight seal at its contact with a metal surface, e.g., at inner surface 50 of deflector element 70, as shown in FIGS. 5(A) and 5(B).

What is claimed is:

1. In a filtering device for removing particulate matter from an exhaust stream of a pyrotechnic gas generator for the inflation of an air bag which comprises a filtering body having parallel spaced apart side surfaces, one of which is exposed to a transversely directed exhaust gas stream of said gas generator and the other of which is adjacent an exhaust port of said gas generator, said filtering body having parallel spaced apart end surfaces which bear against metal surfaces within said gas generator to effect a partial seal therewith, the improvement which comprises a sheet formed of compressed particles of a combination of intercalated unexfoliated graphite and exfoliated flexible graphite positioned in a gasket relationship on the end surfaces of the filtering body so that said sheet bears against said metal surfaces.

2. The device of claim 1 wherein the weight percent of intercalated unexfoliated graphite content of said sheet is 10–60%.

\* \* \* \* \*